United States Patent [19]
Johnson

[11] Patent Number: 4,856,308
[45] Date of Patent: * Aug. 15, 1989

[54] AUTOMOBILE STEERING LOCK
[75] Inventor: Charles R. Johnson, Hudson, Ohio
[73] Assignee: James Winner, Sharon, Pa.
[*] Notice: The portion of the term of this patent subsequent to Apr. 19, 2005 has been disclaimed.
[21] Appl. No.: 112,375
[22] Filed: Oct. 26, 1987

Related U.S. Application Data

[63] Continuation of Ser. No. 15,596, Feb. 18, 1987, Pat. No. 4,738,127, which is a continuation of Ser. No. 801,821, Nov. 26, 1985, abandoned.
[51] Int. Cl.$^4$ .............................................. B60R 25/02
[52] U.S. Cl. ................................................. 70/209
[58] Field of Search ................. 70/202, 209, 237, 238, 70/252, 253, 207–211, 214, 215, 216, 217, 225, 226, 227; 280/289; D8/330, 331, 339, 340, 341, 342, 343, 344

[56] References Cited

U.S. PATENT DOCUMENTS

| | | | |
|---|---|---|---|
| D. 289,491 | 4/1987 | Johnson | D8/330 |
| D. 289,491 | 4/1987 | Johnson | D8/330 |
| 1,268,137 | 6/1918 | Mailloux | 292/147 |
| 1,364,539 | 1/1921 | Baker | 70/199 |
| 1,448,658 | 3/1923 | Furber . | |
| 2,528,746 | 11/1950 | Giffin | 70/181 X |
| 3,245,239 | 4/1966 | Zaidener | 70/202 |
| 3,462,982 | 8/1969 | Moore | 70/209 |
| 3,664,164 | 5/1972 | Zaidener | 70/202 |
| 3,742,743 | 7/1973 | Stoyanovitch | 70/209 |
| 3,807,779 | 4/1974 | Enders | 292/147 |
| 4,103,524 | 8/1978 | Mitchell et al. | 70/209 |
| 4,304,110 | 12/1981 | Fain | 70/209 |
| 4,738,127 | 4/1988 | Johnson | 70/209 |

FOREIGN PATENT DOCUMENTS

| | | |
|---|---|---|
| 402771 | 4/1970 | Australia . |
| 106072 | 12/1966 | Denmark . |
| 2718291 | 10/1978 | Fed. Rep. of Germany . |
| 1127524 | 9/1968 | United Kingdom . |
| 1554593 | 10/1979 | United Kingdom . |
| 2024307 | 1/1980 | United Kingdom . |
| 2039840 | 8/1980 | United Kingdom . |

OTHER PUBLICATIONS

Advertisement for Dailey News Classified 6/28/84, Royce Union "Anti-Theft Steering Wheel & Brake Pedal Lock", #A23105.
Royce Union Security Products #A23105 and A23204, no date shown.
J.C. Whitney & Co. Catalog, ©1982, Catalog 430B, p. 83, "Heavy Duty Steering Wheel & Brake Lock", 81-03369P, 1983.
Allison Catalog p. 70, Anti-Theft Devices: "Crook Hook", 1983, #8370.
Exhibit "A"—New Items from WOLO Numbered pp. 00066–00067.
Exhibit "B"—Do-It-Yourself Automotive Products, Numbered pp. 00052–00059.
Exhibit "C"—Automotive Security Products, Numbered pp. 00001–00028.
Exhibit "D"—Automotive Security Products, Numbered pp. 00060–00065.
Exhibit "E"—Automotive Security Products, Numbered pp. 00029–00051.
Advertisement for "The Club".
Report and Recommendation of Magistrate Amon in Litigation of CV-88-0176 (JMcL) including Exhibits.
Copy of Objections to Magistrate's Report and Recommendations.

Primary Examiner—Richard E. Moore
Attorney, Agent, or Firm—Body, Vickers & Daniels

[57] ABSTRACT

An antitheft device for attachment to a steering wheel of an automobile comprising an elongated body member having a passage extending along an axis therethrough, first hook means secured to the body member for engagement with a portion of the steering wheel wherein the first hook means engage the wheel from the inside thereof with the body member extending outward beyond the periphery of the steering wheel, an elongated rod member adapted to move in telescopic fashion in the passageway of the body member along the axis, second hook means secured to the rod member for engaging the inside portion of the steering wheel diametrically opposed to the first hook means, and means associated with the body member engaging the rod within the passage for locking the rod member stationary with respect to the body member at any of a plurality of positions.

6 Claims, 2 Drawing Sheets

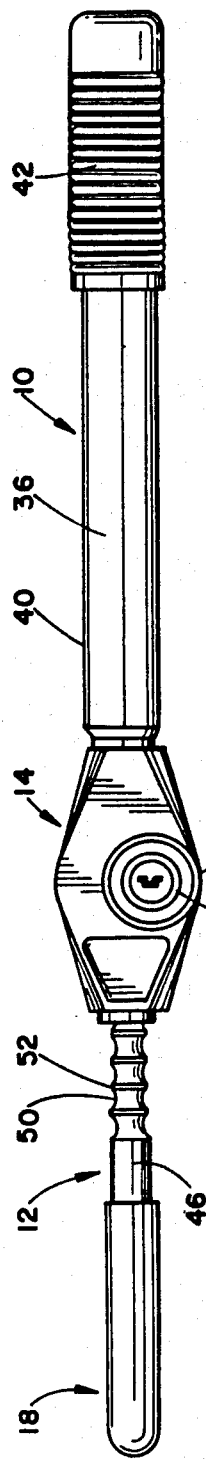
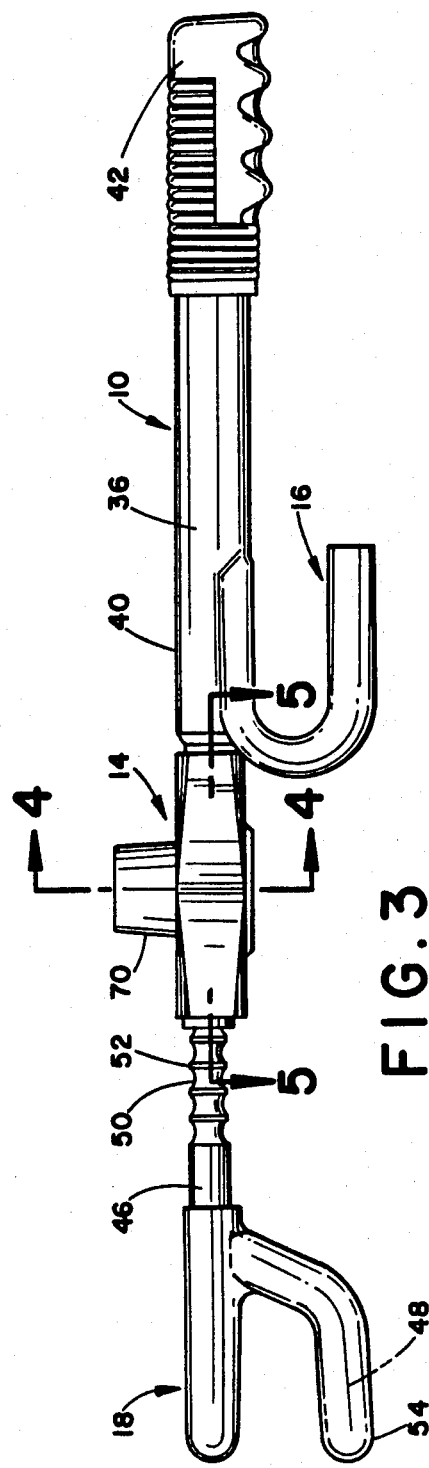
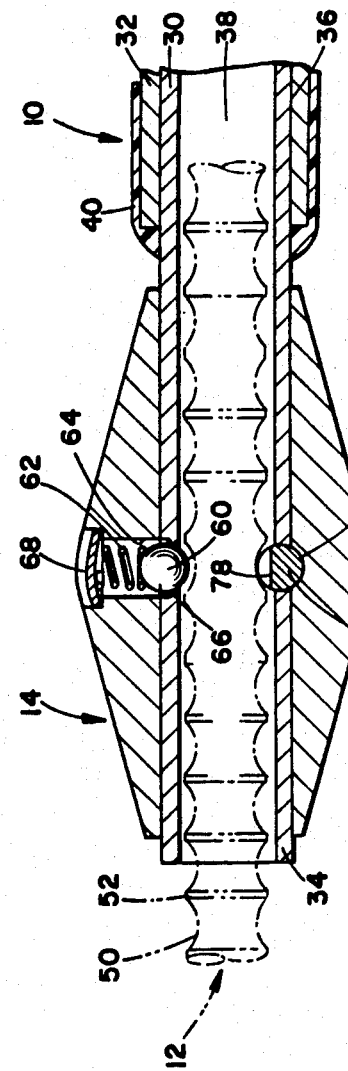
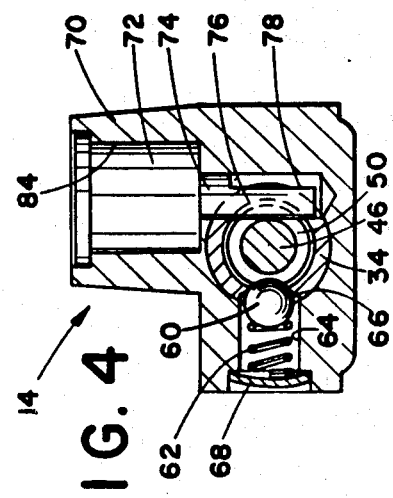

4,856,308

AUTOMOBILE STEERING LOCK

This is a continuation of Ser. No. 015,596 filed 2/18/87, and now U.S. Pat. No. 4,738,127, issued 04/19/88, which is a continuation of Ser. No. 801,821 filed 11-26-85, now abandoned.

FIELD OF THE INVENTION

The present invention pertains to the art of automobile antitheft devices, and more particularly to a device for attachment to an automobile steering wheel to prevent complete rotation thereof.

BACKGROUND OF THE INVENTION

Antitheft devices which attach to an automobile steering wheel have been known heretofore, as shown in U.S. Pat. Nos. 4,304,110 to Fain; 4,103,524 to Mitchell et al; and 3,462,982 to Moore. Such devices include a section which extends outwardly beyond the periphery of the steering wheel a predetermined distance, wherein rotation of the wheel is limited by engagement of such section with an interior surface of the vehicle or the operator. While devices known heretofore are functional, they include several undesirable features. For example, these devices are limited by their construction to steering wheels of specific sizes. Moore U.S. Pat. No. 3,462,982 discloses a device wherein the spacing between the steering wheel engaging hooks is restricted by the length of a ratchet bar over which a locking mechanism and a movable hook travel. Mitchell et al U.S. Pat. No. 4,103,524 and Fain U.S. Pat. No. 4,304,110 disclose devices wherein the spacing between the hooks is fixed. Although Fain U.S. Pat. No. 4,304,110 discloses an alternate embodiment wherein the spacing between the hooks and lugs is adjustable, the amount of adjustment is limited. Accordingly, the sizes of steering wheels to which these devices can be attached is limited.

Another problem with such devices is that they appear susceptible to being overcome by physical force or manipulation. The locking mechanisms of Moore U.S. Pat. No. 3,462,982 and Mitchell et al U.S. Pat. No. 4,103,524 are exposed, and include pry points thereabout in which a crowbar may be inserted in an attempt to overcome such mechanisms. Irrespective of whether such a device can be overcome by physical manipulation, they present prospective thieves with the appearance of being breakable. In this respect, substantial damage to the steering wheel or steering column can result from an attempt to pry such devices.

In addition to these problems, such devices are inconvenient, and at times difficult to use. As is readily apparent, the devices disclosed heretofore each include a relatively long bar for traversing a steering wheel. Due to their length, these devices cannot be stored conveniently in the passenger compartment of the vehicle, and therefore generally require storage in the trunk area. In this respect, they are not readily accessible to the vehicle operator for quick installation. In addition to the inconvenience of storing and retrieving such devices from the trunk area of the vehicle, their length and configuration make attempts to install such devices while the driver remains seated awkward and difficult.

In summary, devices for attachment to sterring wheels known heretofore are, because of their configuration, awkward and inconvenient to use. In addition, such devices are not adjustable for use over a wide range of steering wheel sizes.

These and other problems are overcome by the present invention wherein an antitheft device for attachment to a steering wheel is provided, which device is quick and easy to use, collapsible to a compact size for convenient storage and is designed to prohibit attempts to pry or disengage such device.

SUMMARY OF THE INVENTION

In accordance with the present invention there is provided an antitheft device for attachment to a steering wheel of an automobile, wherein such device includes an elongated tubular body member of predetermined length having a central axis therethrough. First and second longitudinally spaced hooks movable along such axis are provided for engaging diametrically opposed segments of the steering wheel from the inside. The first hook is secured to one end of the body member such that the body extends beyond the circumference of the sterring wheel, and the second hook has means extending within the body member to effect movement therein in telescopic fashion. Means associated with the body is provided for releasably locking the hooks with respect to each other at any one of a plurality of positions.

More specifically, the present invention includes a tubular body member having an elongated passage extending along an axis therethrough. The second hook includes an elongated rod member movable within such passage in telescopic fashion, wherein the hooks are movable relative to each other. Means to lock the rod member within the passage of the body member is provided to limit movement of the rod relative thereto.

Further in accordance with the present invention, a housing associated with the body member is provided, which housing encases a portion of the body member and has the passage extending therethrough. The means for locking the rod member within the passage is contained within such housing. More specifically, the body member is comprised of a metallic material and the housing is die cast around an end thereof to provide an integral structure with the body member, which structure has locking means contained therein.

Still further in accordance with the present invention, transverse and axially spaced grooves are provided along the length of the rod member. A locking member within the housing, and stationary with respect thereto, is movable between a locking first position wherein a portion thereof intersects the passage extending through the body member and a second position wherein such locking member does not intersect the passage. The locking member is designed to matingly engage in loose fashion the grooves on the rod member, such that when in the first position, the locking member intersects the grooves on the rod member and restrict movement of the rod member through the passage. In this respect, the rod may be locked in any one of a plurality of positions along the length of the rod member.

One of the primary objects of the present invention is to provide an antitheft device for attachment to an automobile steering wheel, which device prevents complete rotation thereof and is strong, inexpensive and easy to use.

Another object of the present invention is to provide an antitheft device as defined above, which device will not damage or injure the steering wheel and can be installed quickly.

A still further object of the present invention is to provide an antitheft device as described above, which device requires no modification or alteration to the automobile steering wheel.

A still further object of the present invention is to provide an antitheft device as described above wherein such device includes longitudinally spaced hooks movable in telescopic fashion relative to each other for engagement with diametrically opposed segments of a steering wheel.

Another object to the present invention is to provide an antitheft device as described above wherein the spacing between the hooks is adjustable over a wide range to accommodate most automotive steering wheels.

Another object of the present invention is to provide a device as described above wherein the overall length of such device can be reduced to a size which is compact and easily stored.

A still further object of the present invention is to provide a device as described above wherein the hooks can be releaseably locked with respect to each other at any one of the plurality of positions.

A still further object to the present invention is to provide a locking device as described above wherein the locking mechanism is totally enclosed therein and includes no area susceptible to prying by a crowbar or the like.

These and other objects and advantages of the invention will become apparent from the following description of a species thereof taken together with the accompanying drawing.

BRIEF DESCRIPTION OF THE DRAWING

Invention may take physical form in certain parts and arrangement of parts, a preferred embodiment of which will be described later in detail in the specification and illustrated in the accompanying drawings which form a part hereof and wherein:

FIG. 2 is a top view of the antitheft device shown in FIG. 1 showing the device assembled;

FIG. 3 is a side view of the antitheft device shown in FIG. 1 as assembled;

FIG. 4 is an enlarged sectional view taken along line 4—4 of the FIG. 3; and

FIG. 5 is an enlarged sectional view taken along line 5—5 of FIG. 3.

DETAILED DESCRIPTION OF A PREFERRED EMBODIMENT

Figure 1:
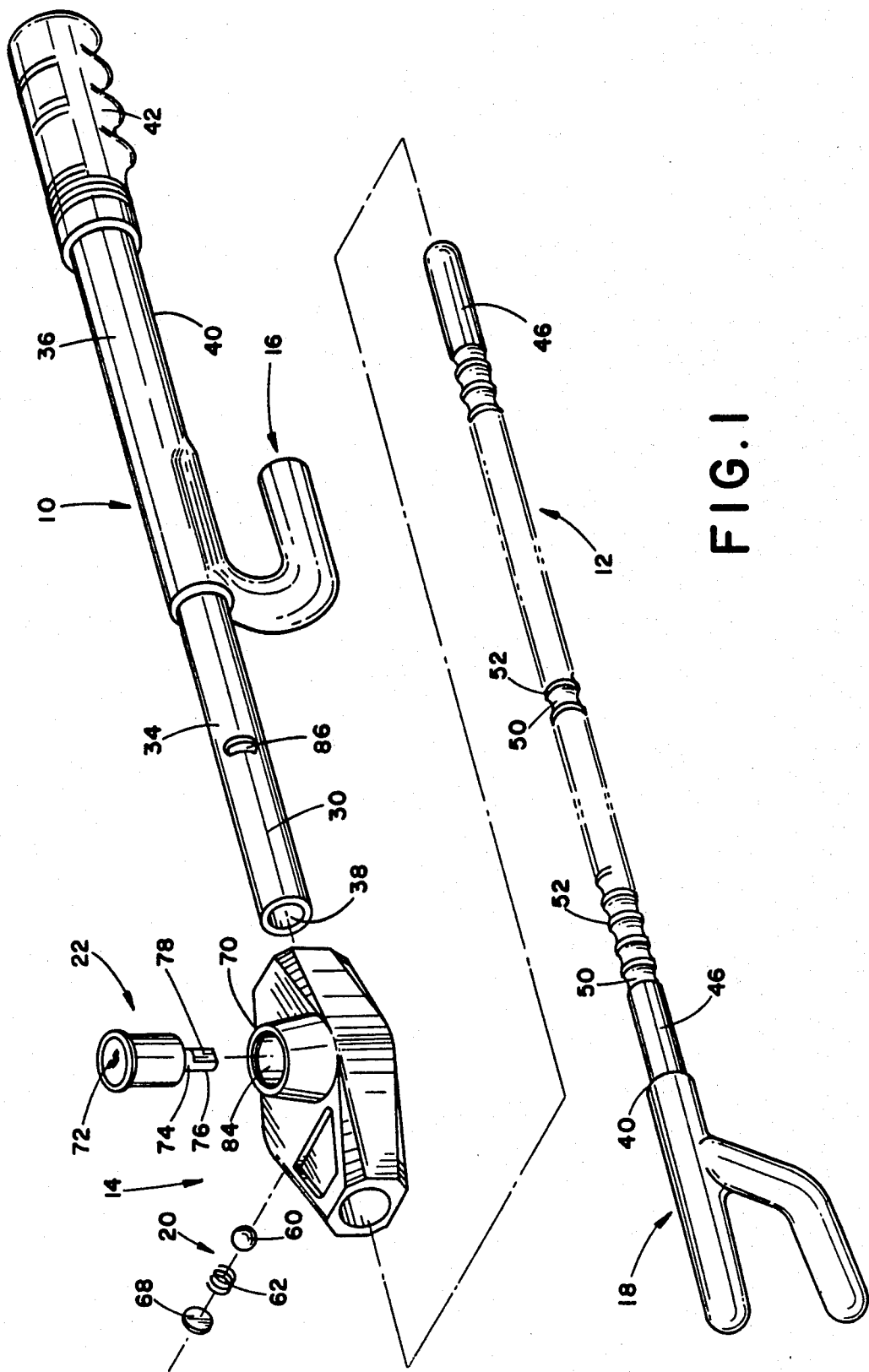
FIG. 1 is an exploded view shown in perspective of an antitheft device illustrating a preferred embodiment of the present invention.

Referring now to the drawings wherein the showings are for the purpose of illustrating a preferred embodiment of the invention only and not for the purpose of limiting the same, FIG. 1 shows an exploded view of an antitheft device according to the present invention. Broadly stated, the antitheft device is comprised of an elongated body member 10, an elongated rod member 12 which is dimensioned to move in telescopic fashion within body member 10, and a housing 14. Hooks 16, 18, for engaging diametrically opposed portions of the steering wheel from the inside thereof, are provided on body member 10 and rod member 12, respectively. Locating means 20 and locking means 22 are provided within housing 14 to position and lock rod member 12 stationary with respect to body member 10 at any one of a plurality of positions.

More specifically, body member 10 is comprised of an elongated tube 30 of circular cross-section. Tube 30 defines a central passage 38 of circular cross-section concentric about an axis A through body member 10. According to the preferred embodiment, tube 30 is surrounded by an outer sleeve 32 to provide a double-walled section 36, as best seen in FIG. 5. A portion 34 of tube 30 extends beyond the end of section 36. U-shaped hook 16 is fixedly secured to sleeve 32 adjacent portion 34 such that it opens along section 36 of body member 10. In the preferred embodiment, tube 30 and sleeve 32 are comprised of lengths of standard structural steel pipe welded together. Hook 16 is a length of standard pipe vent or otherwise formed into a U-shaped configuration and welded to sleeve 32. A durable plastic coating 40 is provided over sleeve 32 and hook 16 to provide a nonabrasive surface over section 36. A handle or grip 42 is secured to the free end of double-walled section 36.

Rod member 12 is comprised of an elongated rod 46 of circular cross-section. The outer diameter of rod 46 is dimensioned slightly less than the diameter of passage 38 in body member 10 to enable rod 46 to move freely in telescopic fashion in body member 10. A generally L-shaped member 48, shown in phantom in FIG. 3, is fixedly secured to the ends of rod 46 to form hook 18 which opens opposite hook 16 for engagement with a diametrically opposed portion of a steering wheel. Annular grooves 50, transverse to the axis of rod 46 are provided along a major portion thereof. Grooves 50 are generally semi-circular and are axially spaced along rod 46 to provide intermediate surfaces 52. The hook end of rod member 12 is provided with a plastic coating 54 similar to that provided on section 36 of body portion 10. In the preferred embodiment, rod 46 and L-shaped member 48 are comprised of case-hardened steel.

Referring now to FIG. 5, housing 14 is formed around extending portion 34 of tube 30 to form an integral structure therewith wherein passage 38 extends therethrough. As set forth above, housing 14 contains locating means 20 and locking means 22. Locating means 20 is generally comprised of a spherical bearing 60, and biasing springs 62 disposed within a bore 64 in housing 14. Bore 64 communicates with passage 38 as shown in FIGS. 4 and 5. In this respect, bore 64 extends through portion 34 of tube 30. An annular flange 66 is provided at the end of bore 64 to restrict complete access of bearing 60 into passage 38. Bearing 60 and spring 62 are maintained in bore 64 by retainer 68. Spring member 62 is confined within bore 64 in compression such that bearing 60 is biased towards, and partially exposed in, passage 38.

With respect to locking means 22, housing 14 includes a boss 70 laterally offset with respect to axis A of body member 10. Locking means 22 is comprised of a conventionally known key lock 72 and a locking member 74. Locking member 74 is generally cylindrical in shape and includes an arcuate outer surface 76 of a diameter generally matching the semicircular grooves 50 in rod 46, and a flat or recessed portion 78. A washer member (not shown) is provided between lock 72 and locking member 74 to effect rotational movement of locking member 74 about its axis when lock 72 is locked and unlocked. To accomodate lock 72 and locking member 74, bore 84 of varying diameter is provided through boss 70 into housing 14. Bore 84 intersects tube 30 and produces a slot or aperture 86 which intersects passage 38, as shown in FIG. 1. Bore 84 is aligned relative to passage 38 such that arcuate surface 76 of locking member 74 is partially disposed within pasasge 38 when locking member 74 is in a first position, and recess 78 is oriented toward passage 38 when member 74 is rotated 180° to a second position. Further in this respect, bore 84 is disposed relative to bore 64 such that when spherical member 60 is aligned with a groove 50 on rod 46, locking member 74 is likewise alinged with a groove 50 on rod 46. According to the present invention, spherical bearings 60 and locking member 74 are disposed opposite each other in housing 14 such that they align with the same groove 50 on rod 46.

As set forth above, tube 30 and sleeve 32 of body member 10 are comprised of lengths of standard steel pipe. In accordance with the present invention, housing 14 is comprised of steel and is die-cast around portion 34 of tube 30 to form an integral structure therewith. Bores 64 and 68 for locating means 20 and locking means 22 are machined or otherwise formed in housing 12 while tube 30 is part thereof. Accordingly, aperture 84 in tube 30 would be formed within housing 14, and is shown in FIG. 1 merely for the purposes of illustration.

In operation, when flat or recess portion 78 of locking member 74 is oriented toward passage 38 as shown in FIG. 5, rod member 12 can move in telescopic fashion within passage 38 of body member 10 by overcoming the ratcheting effect of spherical bearing 60 engaging grooves 50. In this unlocked condition, hook 16 is positioned to engage a portion of a steering wheel from the inside thereof. Rod member 12 is then telescoped out of body member 10 until hook 18 engages a diametrically opposed portion of the steering wheel. Locating means 20 will indicate the most advantageous position at which locking member 74 can be rotated to lock rod member 12 stationary in body member 10. The outward extending portion of body member 10, i.e. section 36, prevents complete rotation of the steering wheel by engaging the interior surface of the vehicle or the operator. To this end, the length of body member 10 which extends beyond the periphery of the steering wheel need only be long enough to engage the interior surface or the operator. As will be appreciated, this dimension can vary. In the preferred embodiment, the outward extending portion of body member 10 is approximately 11 inches.

Accordingly, the present invention provides an anti-theft device which is quick and simply to use. It will also be appreciated that the present invention because of its configuration presents a formidable obstacle to a potential thief. In this respect, a device according to the present invention provides no external pry points wherein a crowbar or screwdriver can be inserted. Further, the device cannot be easily sawed because of the double wall construction of the body member, the steel cast housing, and the case-hardened steel rod.

More importantly, the telescoping arrangement of the present invention provides an antitheft device which can be collapsed to a length suitable for easy storage within the passenger compartment of the vehicle. Still further, the telescoping arrangement makes the present device compatible for use with almost all sizes of automobile steering wheels.

The invention has been described with reference to the preferred embodiment. It will be appreciated that modifications or alterations could be made without deviating from the present invention. For example, the body member and rod member need not have circular cross-sections. A rod having rectangular cross-section could be provided and matched with the body member having a rectangular passage without deviating from the present invention. Likewise, other locating arrangements could be provided to effect locking of the rod member within the body member. These and other modifications and alterations will occur to others upon their reading and understanding of this specification. It is intended that all such modifications and alterations be included insofar as they come within the scope of the patent as claimed or the equivalence thereof.

Having thus described the invention, the following is claimed:

1. An anti-theft device for attachment to a steering wheel of an automotive vehicle comprising:

an elongated tubular member having an inner end, an outer end and an elongated passageway extending along its axis therethrough, said tubular member having a generally U-shaped hook portion extending therefrom with the closed end of the U-shaped portion generally adjacent to but slightly spaced from the inner end of said tubular member and the open end of said U-shaped portion facing said outer end of said tubular member but substantially removed therefrom, said U-shaped hook portion of said tubular member further defined by a bottom leg portion generally extending in the direction of said tubular member's axis and terminating at a distance substantially removed from said outer end of said tubular member, said U-shaped hook portion of said tubular member adapted to engage said wheel from the inside thereof with said outer end of said tubular member extending a substantial distance beyond the periphery of said wheel;

an elongated rod member having an inner and an outer end, said inner end adapted to extend in a telescopic manner within said passageway of said tubular member, said outer end of said member being formed in to a generally U-shaped portion with the opening of said U-shaped portion at said outer end of said rod member, said U-shaped portion of said rod member adapted to engage said wheel from the inside thereof, said rod member further including a plurality of spaced annular grooves disposed about a portion thereof;

a lock, and means for securing said lock to said inner end of said tubular member including (i) locating means permitting telescopic movement of said rod member in a yieldably resisting manner and (ii) locking means rotatable from an unlocking position permitting telescopic movement of said rod member within said tubular member to a locking position preventing relative movement between said rod member and said tubular member;

said locking means including said tubular member having a circular opening formed in said inner end thereof, said lock having a blind passageway aligned with and opening to said circular opening when said lock is assembled to said tubular member, a spherical bearing contained within said passageway, said bearing having a diameter slightly greater than said cirucular opening and biased into said circular opening to partially intersect said passageway and said annular grooves in said rod member to connect said lock to said tubular member and said locking means further including said tubular member having a slot formed therein diametrically opposite said circular opening, a generally cylindrical locking member rotatably mounted within said lock and aligned with said slot in said tubular member, said locking member having a flat portion on one side thereof and an arcuate portion opposite thereto and rotatable from said unlocking position whereat said flat portion is approximately flush with said slot to a locking position whereat said arcuate portion extends through said slot to contact one of said annular grooves of said rod member to connect said lock to said tubular member in both said locking and unlocking positions.

2. An anti-theft device for attachment between two points defining a chord on the rim of an automobile steering wheel comprising:
a tubular member, said tubular member having an inner open end adapted to be positioned within said rim, first hook means on said tubular member for securing said device to one of said ponts on said steering wheel;
a rod member telescopingly received within said tubular member, said rod member having regularly spaced grooves extending from one end thereof over a longitudinal portion of said rod member, second hook means on said rod member for securing said device to the other one of said points on said steering wheel;
one of said members having a predetermined length so that when said first and second hook means secure said device to said rim said member's length prevents continued rotation of said steering wheel;
a lock on said tubular member;
means for securing said lock to said inner end of said tubular member including locating means permitting telescopic movement of said rod member in a yieldably ratcheting manner and locking means rotatable from an unlocking position permitting telescopic movement of said rod member within said tubular member to a locking position preventing relative movement between said rod member and said tubular member;
said locating means including said tubular member having a circular opening formed in said inner end thereof, said lock having a closed passageway aligned with and opening to said circular opening when said lock is assembled to said tubular member, a spherical bearing contained within said passageway, said bearing having a diameter slightly greater than said circular opening and biased into said circular opening to partially intersect said passageway and contact said grooves in said rod member to connect said lock to said tubular member while restraining lateral movement of said rod member within said tubular member; and
said locking means including said tubular member having a slot formed therein diametrically opposite said circular opening, a generally cylindrical locking member rotatably mounted wtihin said lock and aligned with said slot in said tubular member, said locking member having a flat portion on one side thereof and an arcuate portion opposite thereto and rotatable from said unlocking position whereat said flat portion is approximately flush with said slot to a locking position whereat said arcuate portion extends through said slot to contact one of said annular grooves of said rod member thus locking said rod member to said tubular member in said locking position while connecting said lock to said tubular member in both said locking and unlocking positions.

3. The anti-theft device of claim 2 wherein said grooves are annular grooves extending transversely to the end of said rod member and generally semi-circular in profile, said grooves separated from one another by intermediate cylindrical surfaces whereby said locating means assures positive engagement of said locking member.

4. An anti-theft device for attachment between two points defining a chord on the rim of an automobile steering wheel comprising:
a tubular member extending along an elongated axis, said tubular member having an inner open end adapted to be positioned within said rim, first hook means on and depending from said tubular member for securing said device to one of said ponts on said steering wheel;
a rod member extending along an elongated axis and telescopingly received within said tubular member, said rod member having regularly spaced grooves extending from one end thereof over a longitudinal portion of said rod member, second hook means on and depending from said rod member for securing said device to the other one of said points on said steering wheel;
one of said members having a predetermined length so that when said first and second hook means secure said device to said rim said member's length prevents continued rotation of said steering wheel;
each of said hook means forming a generally U-shaped hook with the bight portion extending from said elongated axis, one of said hook means positioed at one end of its member and the other hook situated in between said ends of its member whereby said device can be easily attached to said rim from a contracted to an expanded position without any pry points;
a lock on said tubular member;
means for securing said lock to said inner end of said tubular member including locating means permitting telescopic movement of said rod member in a yieldably ratcheting manner and locking means rotatable from an unlocking position permitting telescopic movement of said rod member within said tubular member to a locking position preventing relative movement between said rod member and said tubular member, said locating and locking means permitting rotation of one member relative to the other member whereby said device is adapted to be attached to a wide variety of steering wheels;
said locating means including said tubular member having a circular opening formed in said inner end thereof, said lock having a closed passageway aligned with and opening to said circular opening when said lock is assembled to said tubular member, a spherical bearing contained within said passageway, said bearing having a diameter slightly greater than said circular opening and biased into said circular opening to partially intersect said passageway and contact said grooves in said rod member to connect said lock to said tubular member while restraining lateral movement of said rod member within said tubular member; and
said locking means including said tubular member having a slot formed therein diametrically opposite said circular opening, a generally cylindrical locking member rotably mounted within said lock and aligned with said slot in said tubular member, said locking member having a flat portion on one side thereof and an arcuate portion opposite thereto and rotatable from said unlocking position whereat said flat portion is approximately flush with said slot to a locking position whereat said accurate portion extends through said slot to contact one of said annular grooves of said rod member thus locking said rod member to said tubular member in said locking position while connecting said lock to said tubular member in both sid locking and unlocking positions.

5. The device of claim 4 wherein said lock includes a body portion generally closely configured to said tubular member and a boss portion extending from said body portion so that said device is further adapted to be attached to many different steering wheels with minimal interference.

6. The device of claim 5 wherein the distance from said hook positioned intermediate said ends of one of said member approximately 11 inches and said device has a contracted position whereby said rod member is telescopingly received within said tubular member and an expanded position whereat said rod member is telescoped from said tubular member with said hooks opening in oppositely facing directions to permit engagement of the interior of said rim by said bight portion of said hook, thus permitting said distance to establish an interference fit preventing said wheel rotation whereby a compact device results.

* * * * *